United States Patent [19]
Staron

[11] 3,794,978
[45] Feb. 26, 1974

[54] SYSTEMS FOR THE TRANSMISSION OF CONTROL AND/OR MEASUREMENT INFORMATION

[75] Inventor: Philippe Staron, Ris Orangis, France

[73] Assignee: Compagnie Generale De Geophysique, Paris, France

[22] Filed: Aug. 20, 1971

[21] Appl. No.: 173,505

[30] Foreign Application Priority Data

Aug. 25, 1970 France .............................. 7031056

[52] U.S. Cl. .......................... 340/170, 340/146.1 R
[51] Int. Cl. .......................... G08c 25/00, H041 7/08
[58] Field of Search 178/66 R; 340/146.1 R, 146.1 E, 340/146.1 D, 170

[56] References Cited

UNITED STATES PATENTS

| | | | |
|---|---|---|---|
| 3,380,023 | 4/1968 | Magnuski | 340/147 R |
| 3,440,346 | 4/1969 | Norby | 178/66 R X |
| 3,479,458 | 11/1969 | Lord et al. | 340/146.1 R X |
| 3,491,202 | 1/1970 | Bailey et al. | 178/88 |
| 3,496,536 | 2/1970 | Wheeler et al. | 340/146.1 E |
| 3,510,585 | 5/1970 | Stone | 178/66 R |
| 3,524,169 | 8/1970 | McAuliffe et al. | 340/146.1 R X |
| 3,550,082 | 12/1970 | Tong | 340/146.1 D |
| 3,562,710 | 2/1971 | Halleck | 340/146.1 E |
| 3,571,794 | 3/1971 | Tong | 340/146.1 D |
| 3,648,237 | 3/1972 | Frey, Jr. et al. | 340/146.1 D |

*Primary Examiner*—Donald J. Yusko
*Attorney, Agent, or Firm*—Oberlin, Maky, Donnelly, Renner & Donald D. Jeffery

[57] ABSTRACT

Apparatus for and method of synchronous transmission of digital control and/or measurement information over a high frequency transmission link with high reliability. A predetermined number of known pseudo-random sequences of selected duration are generated synchronous with a low-frequency sinusoidal subcarrier, each representing one datum of digital information. These sequences are used to phase-reversal modulate the subcarrier which in turn modulates a high-frequency carrier. A receiver demodulates the signal, restoring the original series of pseudo-random sequences. The same pseudo-random sequences as are generated in the transmitter are independently generated in the receiver and are phase-locked and individually compared with each restored sequence. When a correlation is found, the datum of information which corresponds to the transmitted pseudo-random sequence is known. A preferred application is to seismic experimentation.

10 Claims, 13 Drawing Figures

| SHAPE / OUTPUT | 1 | 2 | 3 | 4 | 5 | 6 | 7 | 8 | FORM OF SIGNAL |
|---|---|---|---|---|---|---|---|---|---|
| A | 0 | 1 | 0 | 1 | 1 | 1 | 0 | 0 | |
| B | 0 | 0 | 1 | 0 | 1 | 1 | 1 | 0 | |
| C | 1 | 0 | 0 | 1 | 0 | 1 | 1 | 1 | |
| D | 1 | 0 | 1 | 1 | 1 | 0 | 0 | 1 | |

SYSTEMS FOR THE TRANSMISSION OF CONTROL AND/OR MEASUREMENT INFORMATION

BACKGROUND OF THE INVENTION

This invention concerns synchronous information transmission systems, in which high transmission reliability is required, and in which the number of sets of information which it is desired to transmit in unit time is small.

Such transmission systems are therefore generally used when the nature of the information transmitted, the importance of the investments involved and/or safety with regard to experimental dangers impose a considerable reliability of control. Such systems may be used for the transmission of command or control information of small quantity measurements, preferably the transmission of command or control information requiring a high degree of reliability, and measurement information consequent on the said command or control.

Such systems are of particular interest in seismic prospecting. In fact, one known technique of seismic prospecting is the study of the transmission of acoustic waves in the terrestrial subsoil. An acoustic pulse is generated in the subsoil, and the transmitted acoustic waves are received directly, after reflection and/or refraction, by a number of seismographs set up at a certain distance away. For such wave propagation problems, in addition to the transmission of the command for the acoustic pulse, strict definition of the instant of generation of the acoustic pulse is fundamental.

Furthermore, such an acoustic pulse or seismic shock is generally produced by firing an explosive charge, and the instant of the command to fire and the instant of the explosion may be separated by a variable delay possessing a random component.

It is therefore necessary, in the case of remote control of firing, to know this variable delay with precision. Remote control is generally carried out in a mobile installation called a laboratory, and generally set up in the vicinity of one of the seismographs. Depending on the distance between the laboratory and the site of the explosion, a distance which may vary in the course of the experimentation, transmission is made by means of a connection by wire or a connection by radio.

In both cases, problems of noise in the connection arise. These problems, however, are not so important for connections by wire as for radio connections or links, which depend on numerous parameters, particularly on the environment.

In what follows in this description only radio links will be dealt with, it being understood that the applications to connections by wire are similarly possible.

In known systems of information transmission by a radio frequency carrier wave, the carrier wave is modulated ON-OFF by means of a low-frequency sub-carrier, which corresponds to a piece of binary information or bit. The instant at which this modulation is effected corresponds for example to control or order information.

These systems have serious disadvantages. In fact, at the receiving station, a filter tuned to the said sub-carrier is used. For satisfactory protection from noise, a narrow-band filter is used; in this case, the instant transmission of the information is not well defined, because the transition of a narrow filter during the application of a sub-carrier is slow and therefore inaccurate. At the expense of satisfactory protection from noise, the time accuracy is low.

Conversely, if a filter having a wider pass-band is employed, the time accuracy is improved, to the detriment of protection from noise.

Furthermore, for the transmission of a large number of sets of information, a plurality of such sub-carriers must be used. Taking into consideration the limited pass-band of radio links of conventional type, this also leads to a reduction in the band width allotted to each sub-carrier.

It is then impossible to use by means of conventional types of radio links an information transmission system which has both good protection from noise and parasites and good time accuracy by utilizing ON-OFF modulation by means of one or more low-frequency sub-carriers.

In most cases, and particularly for seismic prospecting, time accuracy of the transmission of control and/or measurement information is fundamental.

A well-known solution of the noise problem is to increase the transmission power of the radio stations or the electric power of the wire-transmitted signal, whereby it is possible to use a wider pass-band for tuned reception filters. High-energy transmissions are therefore quasi instantaneous and permit a high information output. However, a limit is rapidly reached for these power increases for obvious reasons of cost and bulk of the installations, especially when the latter have to be mobile.

SUMMARY OF THE INVENTION

The present invention comprises a novel method of transmission whereby, with the means of the conventional radio link, transmission of control and/or measurement information is possible with very high protection from noise and good time accuracy.

For this purpose, a family of particular signals are used, namely the pseudo-random sequences described in the document "Shift Register Sequences" Salomon W. Golomb, Norman Abranson, San Francisco, 1967 and the principal properties of which are summarised in the following.

These pseudo-random sequences are produced by means of a shift register formed of a certain number of bistable cells in series and adapted to effect counting in binary notation. This counting intervenes at precise instants defined by command signals or time pulses. A logical element combination of the outputs of two cells of the register is returned to the input of the first cell of the said register to form a loop; the pseudo-random sequences are then derived from one another by circular permutation.

FIG. 1A shows the basic diagram of such a generator of pseudo-random sequences. Time pulses are supplied on the line H and command at precise instants the change of state of three binary cells A, B and C, connected in series in that order, the output of cell A being connected to the input of cell B and so forth. An Exclusive-OR logical element combination of the output of the cells B and C is returned to the input of cell A. This combination is supplied by the Exclusive-OR circuit D. The pseudo-random sequences are available at the output of each of the stages A, B, C and D. In the above-mentioned document, it is shown that the duration of the seqeuences obtained with n cells such as A, B and C is $2^n - 1$. In this case, the number n is the order of the cell of the highest order employed for the logical element combination. Since the sequences are derived from one another by circular permutation, it is theoretically possible to obtain $2^n - 1$ different sequences. It would then be necessary to add after this cell of highest order a corresponding number of bistable cells, not involved in the loop of the logical element combination.

In the case of the generator of FIG. 1A, the period of the sequence generator and hence the duration of a sequence generation is seven time pulses ($2^3 - 1$). FIG. 1B gives an example of the successive logical element levels and corresponding signals for the four stages A, B, C and D, that is to say for four pseudo-random sequences used out of the seven theoretically possible ones.

The duration of these sequences is therefore so much greater, the greater is the number of cells from which the said logical element combination forms a loop, and the number of sequences actually available on a shift register looped in this way is equal to the number of cells of this register, including the logical element combination stage.

The pseudo-random sequences have a function of autocorrelation level which is higher, the longer is their duration, therefore the greater is the total number of cells on which looping is produced.

The pass-band necessary for these pseudo-random sequences depends on the frequency of the time signals applied to the shift register generating them, and it is substantially equal to twice that frequency.

The present invention also provides optimum or coherent reception of these frequencies such as is described in: "Principles of Coherent Communications," Andrew J. Viterbi, McGraw Hill, New York, 1966. This reception is effected by means of matched filters, which produce autocorrelation of the transmitted signals.

According to one feature of the invention, at transmission, a low-frequency sinusoidal sub-carrier is used, a predetermined number of pseudo-random sequences of selected duration in synchronism with the said sub-carrier is produced, each of the positive and negative polarities of these sequencies being representative of a state of the information to be transmitted, and phase modulation of the sub-carrier is produced by means of one of the said pseudo-random sequences according to one of the said positive or negative polarities, whereby it is possible to transmit information in the form of a sequence according to one of the positive and negative polarities, the instants of transmission of each set of information coinciding with the commencement of a generation of pseudo-random sequences.

At reception, the phase-modulated sub-carrier is restored, possibly affected by noise. A local sub-carrier, synchronous with the transmitter sub-carrier and of the same frequency as the latter is generated, and the same pseudo-random sequences as those of the transmitter, in synchronism, equal in number and of the same length are generated. Coherent demodulation of the sub-carrier modulated with the restored phase is produced by means of the local synchronous sub-carrier and of each of the local pseudo-random sequences, this demodulation being carried out in parallel as many times as there are pseudo-random sequences generated. The signal issuing from each of the coherent demodulations is utilised at the input terminals of a plurality of matched filters in number equal to that of the coherent demodulators. The output of each of these matched filters supplies a correlation signal between the transmitted pseudo-random sequence and that of the local pseudo-random sequences, which is applied to the coherent demodulator corresponding to the matched filter considered. Correlation signals thus obtained are compared with a plurality of reference values, which provides a plurality of sets of logical information representative of the identity and polarity of the sequence transmitted relative to each of the locally generated pseudo-random sequences. Finally, these sets of comparison logical information are transmitted to an electronic logical decision system which identifies the pseudo-random sequence transmitted, when the noise is not excessive, thus permitting the reliable transmission of the sets of information carried by a pseudo-random sequence, the decision as to the identification of this sequence intervening at the end of the sequence.

The present invention also concerns a transmitter and a receiver for effecting such transmission by means of a radio link using at least one high-frequency carrier wave, frequency-modulated or amplitude-modulated by the aforesaid phase-modulated sub-carrier. The features of such apparatus will appear in the course of the following description made with reference to the drawings. Although the form of transmission according to the invention is particularly advantageous for radio links, it is clear that the phase-modulated sub-carrier may be transmitted by wire.

According to another feature of the invention, strict synchronism of the sequence generators of a transmitter and of at least one receiver is effected by shifting of the sequence generator of each receiver, the transmitter then using a sequence with a known well-defined polarity of the receiver, called waiting sequence. This sequence is also used in the case of absence of information to be transmitted to ensure permanence of the link. This synchronisation stage is used at the commencement of the link and also in error situations which will be examined later.

According to another feature of the invention, a transmitter called "master" transmitter has a privileged situation, particularly with regard to the commencement of the link and the aforesaid error situations. The synchronisation operations are effected automatically under the supervision of an electronic logical element system incorporated in the transmitter and which causes it to transmit the aforesaid waiting signal. In this case, the search for a decision at the receiver level on this waiting sequence is effected automatically by shifting of the local sequence generator of the receiver under the control of the decision logical element of each receiver. The various possible stages for the link are then:

synchronisation stage at the commencement of the link and in prolonged error situations;

waiting stage, during which the waiting sequence is transmitted, synchronisation having been obtained;

testing stage, during which the information-carrying sequences are transmitted, without the said information being taken into consideration for good satisfactory functioning of the transmission;

traffic stage, during which the sequences are transmitted in reply to information control instructions applied to a transmitter.

According to another feature of the invention a plurality of transmitter-receivers are used, one of them being "master" and the others "slaves," and all the generators of sub-carriers and pseudo-random sequences of the transmitters and receivers are synchronised relative to those of the "master" transmitter, the logical elements of one transmitter receiver are interconnected for producing this synchronisation, and for automatically permitting the test stage by means of a there-and-back link. One of the transmission channels at least for each link is assigned to sets of service information for the operation of the transmission, which are effected under the control of the logical element of the "master" transmitter-receiver.

According to another feature of the invention, the transmission of control information and sets of measurement information consequent on the said control is effected, the transmission of control information commencing at the commencement of a generation of pseudo-random sequences and taking effect at the end of the said generation. A family of pseudo-random sequences, which comprises, on the "control" channel, the said control information, is utilised for this purpose. According to the number of information channels, this family comprises one or more sequences according to one of the positive or negative polarities. The delay between the decision or transmission of the control information and the execution of this information is transmitted in numerical form on another transmission channel by means of a coded combination of various pseudo-random sequences, like all the other numerical information of useful measurements.

According to another feature of the invention, the selected number of pseudo-random sequences corresponding to twice the number of possibilities of phase modulation, taking into account the choice between the negative or positive polarities, is selected such that its expression in binary notation corresponds to a whole power of 2. The information channels transmitted then correspond to the digits of different weight of this number of sequences. These digits may assume the values 0 and 1. Transcoding of the sequences for obtaining each information channel is effected in a manner which is simple and easily carried out by the skilled person by means of logical electronic coding circuits of each of the transmitters and the logical decision elements of each of the receivers.

According to another feature of the invention, when the link proves difficult or redundant with pseudo-random sequences of predetermined duration, the change of the duration of these sequences is controlled synchronously for all the sequence generators of a transmission assembly, this operation intervening obligatorily in the course of one and the same sequence generation, whereby optimisation of the transmission conditions is permitted without the necessity of interrupting this transmission, even temporarily.

According to another feature of the invention, in parallel with the waiting sequences whose function is solely to ensure permanence of the transmission, spoken information is also transmitted. At transmission, such information is simply a modulation added to the modulation by the phase-modulated sub-carrier. At reception, the composite signal thus obtained is applied to coherent demodulators, the phase-modulated sub-carrier is restored and removed from the said composite signal, which supplies the spoken information alone.

According to another feature of the invention, the mode of information transmission is used with links in single-sideband. For this purpose, two sub-carriers are used, the first being the sub-carrier according to the invention which undergoes phase modulation by means of pseudo-random sequences. This first sub-carrier modulates a second low-frequency sub-carrier in amplitude with two sidebands and carrier suppression. The frequency of this second sub-carrier is preferably between 2 and 5 times the frequency of the first. The signal thus produced modulates the high-frequency carrier in single-sideband, the reverse process being carrier out for reception.

BRIEF DESCRIPTION OF THE DRAWINGS

Other features and advantages will appear better from a perusal of the following description with reference to the accompanying drawings, which are given as non-restrictive examples and in which.

DESCRIPTION OF PREFERRED EMBODIMENT

The mode of transmission according to the invention from a transmitter to a receiver of a limited number of pseudo-random sequences will now be described in detail to preserve clarity of the explanations and drawings. This description will be made with reference to FIGS. 2 to 6.

Figure 2:
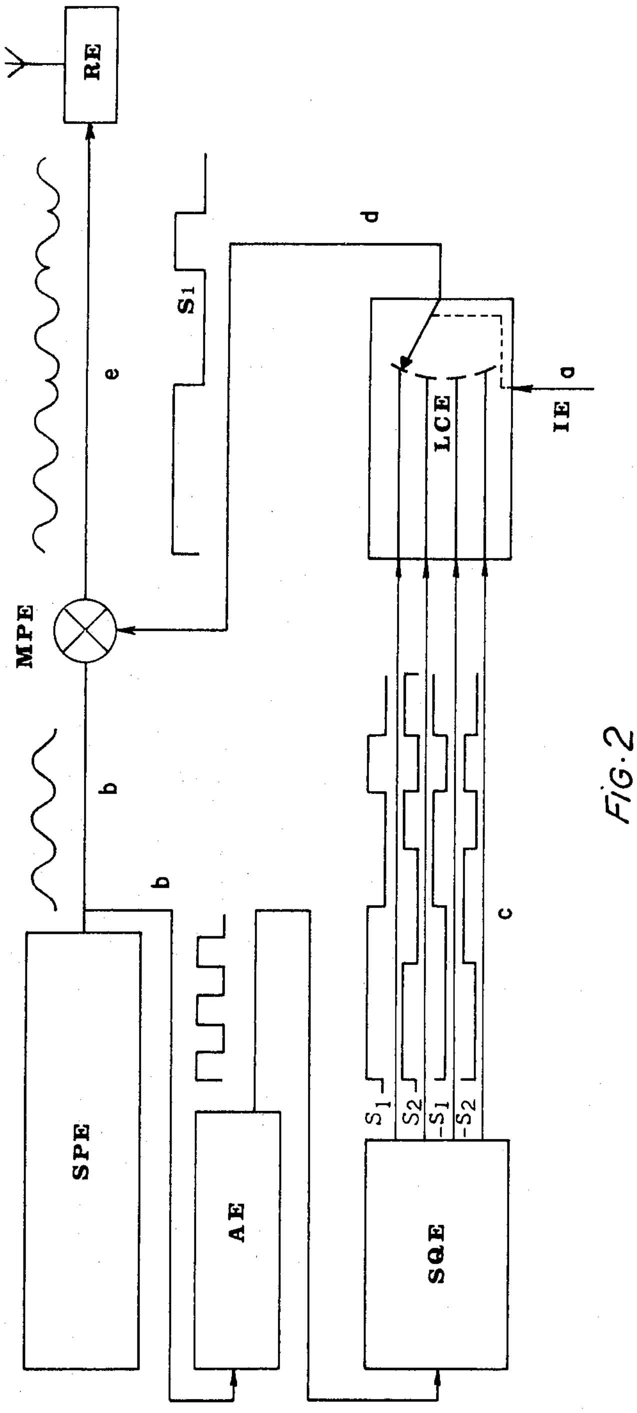
FIG. 2 shows the block diagram of a transmitter according to the invention.

A preferred embodiment of a transmitter according to the invention is shown in FIG. 2. This transmitter comprises a sinusoidal sub-carrier generator SPE, an amplifier peak limiter AE which receives the said sinusoidal sub-carrier and serves to synchronise the pseudo-random sequence generator SQE. This generator SQE supplies two different sequences S1 and S2 with positive and negative polarities. There are therefore available at the output of this generator SQE the sequences S1, S2,-S1, S2. These are applied to a logical electronic coding element LCE, which includes a switch for selecting one of the sequences. This logical element also receives the information to be transmitted over a line IE. As a function of the said information, the logical element selects one of the available pseudo-random sequences, for example S1, and sends it to a phase modulator MPE, where this selected sequence S1 effects the phase modulation of the sub-carrier produced by the generator SPE. The sub-carrier thus phase-modulated is then sent to a radio transmitter RE, where it modulates a high-frequency carrier wave.

The information arriving along the line IE is preferably binary information. Furthermore, the number of available sequences, a, at the input of LCE is equal to four in FIG. 2. According to a preferred coding system of the invention, to each of these sequences its rank in binary notation is made to correspond. For the four sequences of FIG. 2 we have, for example:

| | |
|---|---|
| – S1 | 00 |
| S1 | 01 |
| – S2 | 10 |
| S2 | 11 |

It will be seen that such a combination of two pseudo-random sequences and their opposite signals, altogether four useful signals, permits the formation of all the possible arrangements of two binary bits 0 and 1. We arrange that binary units represent one binary channel and binary tens represent another binary channel. Such a system is easy to generalise, for the skilled person, for a higher number of pseudo-random systems.

Figure 3:
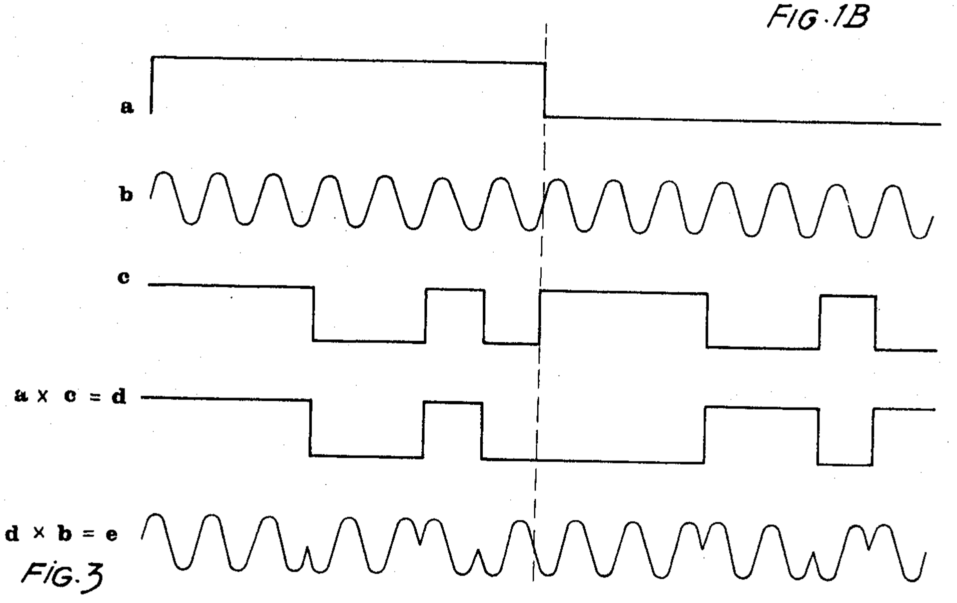
FIG. 3 shows the electrical signals present in the body of the said transmitter.

FIG. 3 shows one of the four possible signals corresponding to binary information 1 then 0 (signal *a*). The sinusoidal sub-carrier is shown at *b*. The output of a generator of pseudo-random sequences is shown at *c*. At *d* is shown the output of the logical coding element corresponding to the product of the signals *a* and *c*, that is to say, first of all the sequence *c* with its positive polarity, then the same sequence with its negative polarity. At *e* is shown the phase modulation of the sub-carrier *b* by the signal *d*. This phase modulation also corresponds to a multiplication. The sub-carrier thus modulated *e*, in turn modulates the high-frequency carrier wave, not shown.

Figure 4:
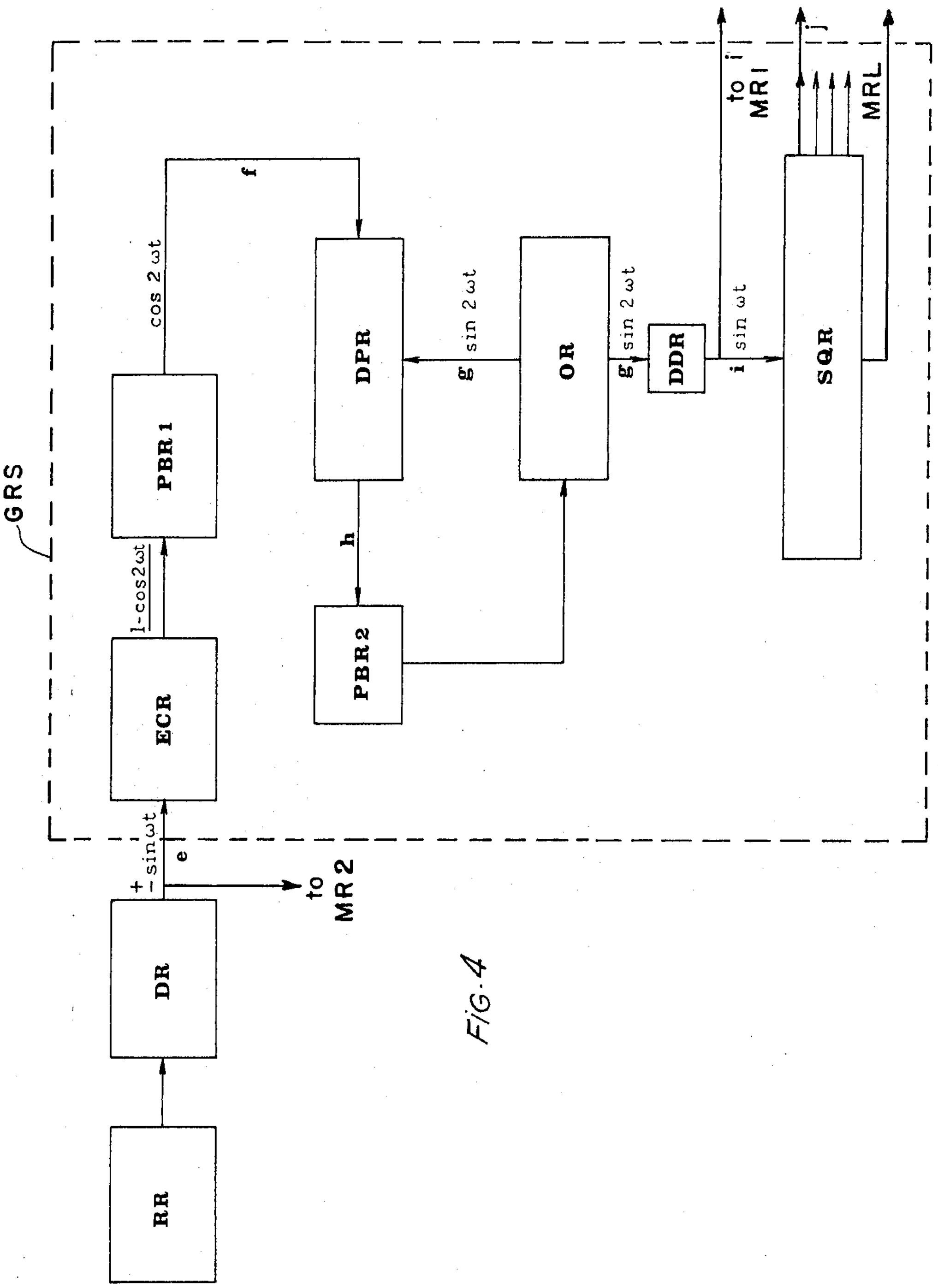
FIG. 4 shows the block diagram of a receiver according to the invention.

We shall now consider FIG. 4 which shows a preferred embodiment of the synchronisation device of a receiver. This device comprises high-frequency reception stages RR, provided with automatic gain control and followed by a demodulator DR, which restores the phase-modulated sub-carrier of the transmission. Phase modulation by a signal formed of square waves is reduced to the transmission of the sub-carrier with its original phase or in phase opposition. That is to say, at the output of the detector DR there appears the signal $\pm \sin \omega t$, such as is shown at e in FIG. 6. This signal is then squared by a stage ECR, at the output of which there appears a signal proportional to $1-\cos 2\omega t$. This signal then passes through a band-pass filter PBRI which, on the one hand, suppresses the d.c. component corresponding to B and on the other hand eliminates any harmonics generated, particularly in the squaring element ECR. At the output of the filter PBR1 there then appears the signal cos 2 $\omega t$ (signal *f* of FIG. 6).

Figure 6:
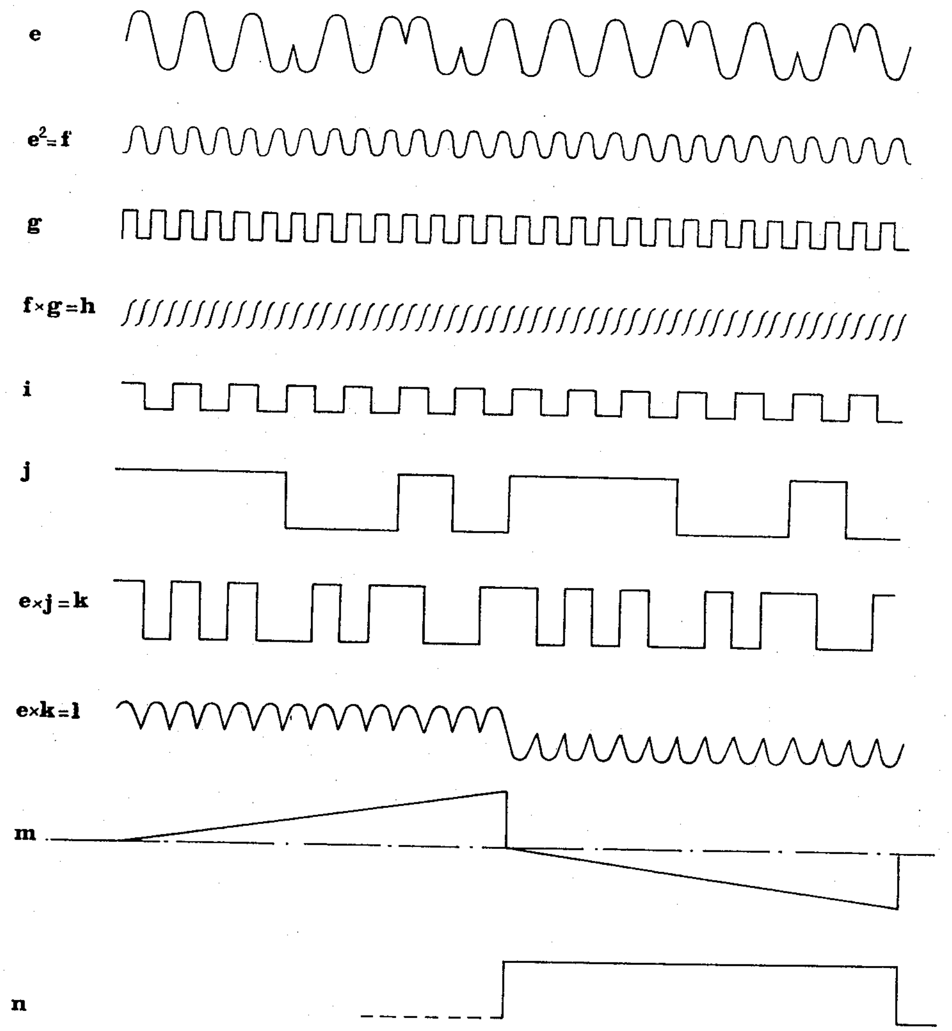
FIG. 6 shows the signals appearing at the indicated locations of FIGS. 4 and 5.

FIG. 4 also shows a local oscillator OR which supplies a signal of double the frequency of that of the sub-carrier used on transmission (signal *g* of FIG. 6). This oscillator OR supplies this signal $\sin 2\omega t$ at two outputs. One of these signals is applied to a phase detector DPR, which also receives from the filter PBR1 the aforesaid signal cos 2 $\omega t$, and supplies at its output a signal h representative of the phase difference between its two input signals. This signal *h* is applied to a low-pass filter PBR2 ensuring synchronism of the local oscillator OR at a frequency double that of the sub-carrier. The output signal *g* of this oscillator is applied to a frequency halving divider DDR, supplying a signal *i* whose frequency is equal to that of the transmission sub-carrier.

This signal *i* is then applied to a sequence generator SQR supplying at least one pseudo-random output sequence such as *j*. SQR is a sequence generator in the receiver identical to SQE in the transmitter, except that it has an additional output line MRL. Line MRL is energized with a start-of-sequence pulse each time a new set of pseudo-random sequences is generated.

The signals *e, f, g, h, i* and *j* are shown in FIG. 6. It should be noted that the signals *g* and *i* which have been denoted in the foregoing by sin 2 $\omega t$ and sin $\omega t$ are preferably square-wave signals.

The signal *i* obtained at the output of the divider DDR may be in phase or in phase opposition with the transmission sub-carrier. This indefiniteness is removed by means of a special procedure to be considered later. The pseudo-random sequence *j* obtained at the output of the generator SQR is in phase and identical with the transmission sequence *c* obtained at the output of the transmitter SQE.

Figure 5:
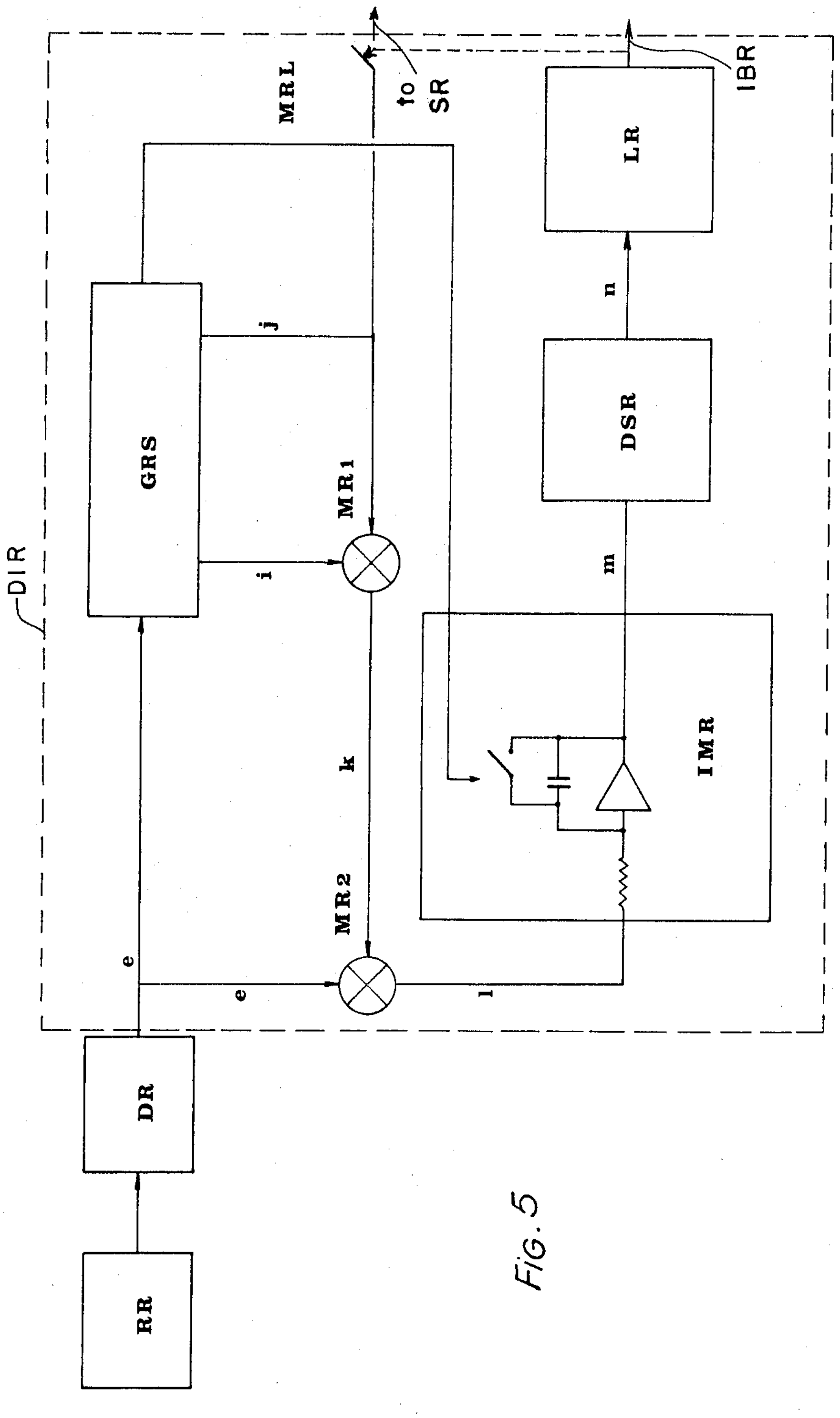
FIG. 5 shows the block diagram of a receiver limited for clarity of the drawing to a coherent demodulator, a matched filter and a decision element corresponding to pseudo-random sequences.

We shall now describe with reference to FIG. 5 coherent demodulation in combination with a matched filter corresponding to a pseudo-random sequence. The first two stages shown in FIG. 5 are the stages RR and DR of FIG. 4. At the output of the detection of the high-frequency wave by the stage DR, there appears the phase-modulated sub-carrier, possibly affected by noise. As has alresady been described with reference to FIG. 4, this sub-carrier is applied to a reference and sequence generator GRS, which comprises the other stages of FIG. 4, and supplies on the one hand a local square-wave signal i at the sub-carrier frequency, and on the other hand at least one pseudo-random sequence, j, as well as synchronisation signals on a line MRL, the utilisation of which signals will be seen later. Note that for simplicity only one sequence j is shown in FIG. 5.

Coherent demodulation of the restored sub-carrier is effected once for each pseudo-random signal generated. For a sequence such as that represented by the signal *j*, its multiplication is carried out in a multiplier MR1 by the local sub-carrier in square-wave signals of the signal *i*, thereby supplying for each pseudo-random sequence a signal *k* (these signals are shown in FIG. 6).

Multiplication of the restored phase-modulated sub-carrier (signal *e*) by each of the signals such as *k* corresponding to a pseudo-random sequence is then carried out in a second multiplier MR2. It should be noted that the signals such as *e* and *k* are different simply because signal i is a square-wave signal. These signals *e* and *k* are therefore distributed identically in the course of their mean value, and if the sequence present in the sequence *k* is the same as that which is present in the signal $e$, the signal $l$ obtained by the last multiplication contains a series of positive alternations if the two sequences have the same polarity, and a series of negative alternations if the sequences are of opposite polarity. These two cases occur, successively in the signal $l$ of FIG. 6.

When the sequences present in the signals $e$ and $k$ are different, the signal $l$ has a series of positive and negative alternations along a sequence, and according to the properties of pseudo-random sequences, the mean value of this signal for the duration of a sequence is substantially zero except for noise.

Signal $l$ is then applied to an integrator IMR which is the matched filter already mentioned. This integrator also receives by the line MRL a zero re-setting signal at the end of each sequence. At its output, when the transmitted sequence and the local signal used are identical, the integrator IMR shows a voltage increasing in absolute value to the end of the said sequence, the sign of this voltage being defined by the polarity of the transmission of the pseudo-random sequence. In the case of the signals shown in FIG. 6, this triangular signal is first positive then negative in accordance with the positive and then negative polarity sequence used for transmission.

The output signal of an integrator such as IMR is applied to a threshold device DSR which supplies logical information representing the crossing of a predetermined threshold by the signal m, this crossing being effected by positive or negative values. DSR can be made of a differential amplifier comparator, well known in the art, and having a reference voltage applied to one of its inputs. The output signal n of this threshold device DSR then reproduces, with a delay corresponding to the duration of a pseudo-random sequence, the signal a carrying information employed at the commencement of the transmission and shown in FIG. 3. The process of the transmission of information by means of one of the pseudo-random sequences has thus been achieved.

Reception according to this preferred embodiment has an important advantage. In fact, correlation is carried out between the received phase-modulated sub-carrier and local signals, each corresponding to the local sub-carrier phase modulated by one of the different pseudo-random sequences. Under these conditions, transmission is effected under the best conditions, taking into account the noise which is inevitably present.

The aforesaid logical information is then received by a logical reception element LR which ensures its decoding and for example its display or for any other purpose such as control or the recording of measurements.

This logical device assumes increased importance when a plurality of pseudo-random sequences are used. It then carries out the opposite operation to coding such as has been described in connection with transmission, and for this purpose it is connected to a plurality of threshold devices, such as DSR, each corresponding to a pseudo-random sequence. These devices may assume three states:

sequence transmitted with positive polarity (+ 1 state);

sequence transmitted with negative polarity (− 1 state);

sequence not transmitted (zero state).

The said logical element LR, therefore, in normal operation only receives logical information differing from 0 from one of the threshold detectors DSR. In this case, as stated above, it carries out the decoding of the said logical information, adapting it to standard Transistor-Transistor (TTL) logic. That is, LR has a respective binary output for each sequence received from DSR.

When the noise level is high, the logical element may receive several such sets of information or no information differing from zero. In this case, it registers a situation of error which interrupts at least provisionally the decoding of information, and gives rise to a special procedure, which will be considered in the following.

It has been observed that for receivers provided with automatic gain control, the probability of the simultaneous existence of a number of decisions, that is to say, a number of siganls differing from zero, at the outputs of all of a plurality of threshold detectors such as DSR, is extremely slight. In fact, in such a case, the mean signal + noise power at the output of the high-frequency wave detector DR is constant. It follows that the only probable error situation is the logical signal 0 at the output of all the threshold detectors DSR.

Two cases then arise. If the link is a single link from a transmitter to a receiver, the transmitter called "master" transmitter plays a privileged part with regard also to the operation of the transmission. This operation has a number of different stages:

Starting and synchronisation of the sub-carrier and double frequency harmonics generators as well as of the sequence generators of the "master" transmitter and of one or more "slave" receivers;

waiting, corresponding to the transmission of a special waiting sequence not carrying information, but ensuring the permanence of transmission and of the said synchronisms. This sequence is preferably also used for obtaining this synchronism and, for that purpose, is known by the construction of the logical elements of the transmitter and receivers;

test, in the course of this stage all the pseudo-random sequences are transmitted successively for verifying the satisfactory functioning of the link without corresponding information being taken into consideration and utilised beyond the logical elements of the receivers;

traffic, in this stage the waiting sequence is transmitted in the absence of information to be transmitted, and when the information is transmitted it is decoded by the logical elements such as LR of each receiver and then used.

Synchronisation of the sequence generator of one or more receivers relative to that of a transmitter is effected according to the invention in the following manner. The local oscillator of each receiver which supplies a signal of double the frequency of that of the transmission sub-carrier ensures synchronisation of the local sub-carrier regenerated in each receiver to within 180°. In the course of the synchronisation stage, the transmitter transmits the waiting sequence, known from the logical element of the receiver. This logical element then carries out the shifting of its sequence generator until it registers a decision at the output of the matched filter corresponding to the waiting sequence, with its correct polarity. This shifting is produced by means of additional time pulses applied to the shift register and picked up at the level of double frequency local oscillator.

When the local sub-carrier of the receiver is in phase opposition with that of the transmitter, the waiting sequence is received with reversed polarity and with a shift of a half-alternation relative to the said sub-carrier. The logical element of the receiver then orders a shift of a half-alternation of the sequence generator of the receiver, and synchronism is strictly obtained.

It should be noted that in the case of a single link from transmitter to receiver, it is necessary to provide in parallel a return telephony link, for example, intended at least for oral transmission of the instants of the end of the synchronisation stage and the end of the test stage. Although this form of link is not very practical, the description will be continued in this way for the purpose of simplification.

Passage from one of the stages described in the foregoing to another is carried out under the control of the logical element of the "master" transmitter in controlled manner by means of a transmission channel specially provided for this purpose. The corresponding information is used directly by the logical element of the receiver, which therefor does not translate them for external use members.

In the case of an error situation, the logical element of a receiver passes to reception of the waiting sequence and the error information is, if possible, transmitted to the transmitter, for example by telephony. The transmitter then sends the waiting sequence until the receivers record a decision possibly by shifting their sequence generators.

If this decision occurs rapidly, the error being accidental, the link is resumed possibly after passing a test stage.

If the error situation proves to be more serious, the "master" transmitter then orders in synchronism the change in the duration of the pseudo-random sequences for all the sequence generators of both transmission and reception.

If the error situation prevents all possibility of transmission, the link is re-started with sequences of longer duration, unilaterally at the transmitter, and the synchronisation stage is carried out. This error situation, preventing any possibility of linking, is highly improbable except for serious developments at the transmitting end.

The form of transmission according to the invention which has proved to be still more advantageous uses a "master" transmitter-receiver and at least one "slave" transmitter-receiver, whereby it is possible to dispense with the above-mentioned telephony return link. In this case, at least one transmission channel is reserved for transmission service information.

Figure 1A:
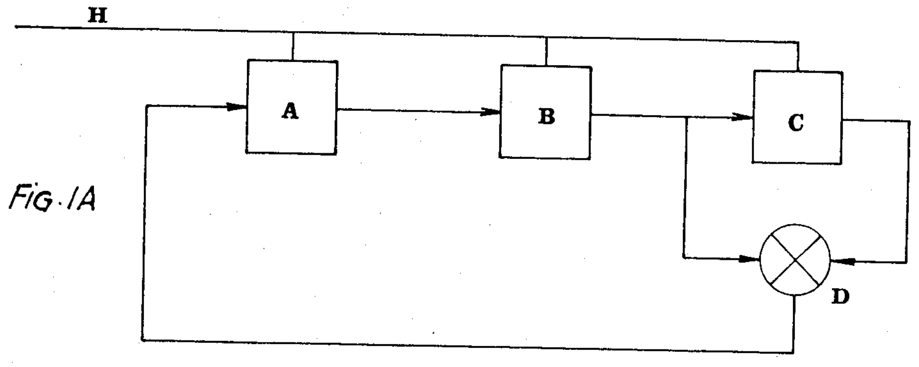
FIGS. 1A and 1B, already mentioned, represent respectively a generator of pseudo-random sequences having three cells, in which the second and third cell outputs are combined according to an Exclusive-OR circuit, whose output is connected to the input of the first cell, and the logical states are successively represented by the outputs of each of these cells, as well as the profiles of the corresponding pseudo-random sequences.
Figure 1B:
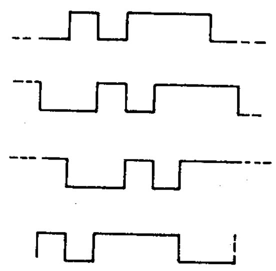

Synchronisation of the sequence generators is carried out in the following order:

- the sequence generator of the master transmitter serves as a pilot generator,
- the sequence generators of each "slave" receiver are synchronised with the pilot generator,
- internally, the generators of each "slave" transmitter are synchronised with that of their associated receiver; this operation is generally carried out by the application of the sole logical combination of cells of the shift register (FIG. 1) of a slave receiver, for both the shift register of the associated "slave" transmitter and receiver,
- synchronisation of the sequence generator of the "master" receiver with at least one of those of the "slave" transmitters. This operation practically ensures synchronisation between the "master" receiver and all the "slave" transmitters.

These operations are applicable to a link between transmitters and receivers in duplex or alternate operation. In the latter case, the order for changing the direction of transmission is made under the control of the logical element of the "master" transmitter-receiver.

Each "master" or "slave" transmitter-receiver has suitable connections between its transmission and reception logical elements on the one hand for the transmission channels corresponding to the operation of the link, and on the other hand for certain useful information necessitating a forward-and-return transmission, more particularly in the seismic domain, as will be seen further below.

There is, therefore, no fundamental difference between a "master" transmitter-receiver and a "slave" transmitter-receiver, and the mode of transmission according to the invention is advantageously put into practice by means of identical transmitters-receivers, in which a simple switching operation permits operation as "master" transmitter-receiver or "slave" transmitter receiver. These switching operations correspond for passage to the "master" position to the disruption of synchronism between the transmitter and receiver sequence generators and to the employment of logical circuits which carry out the supervision of the forward-and-return transmission according to the various stages which will now be summarised.

Figure 7:
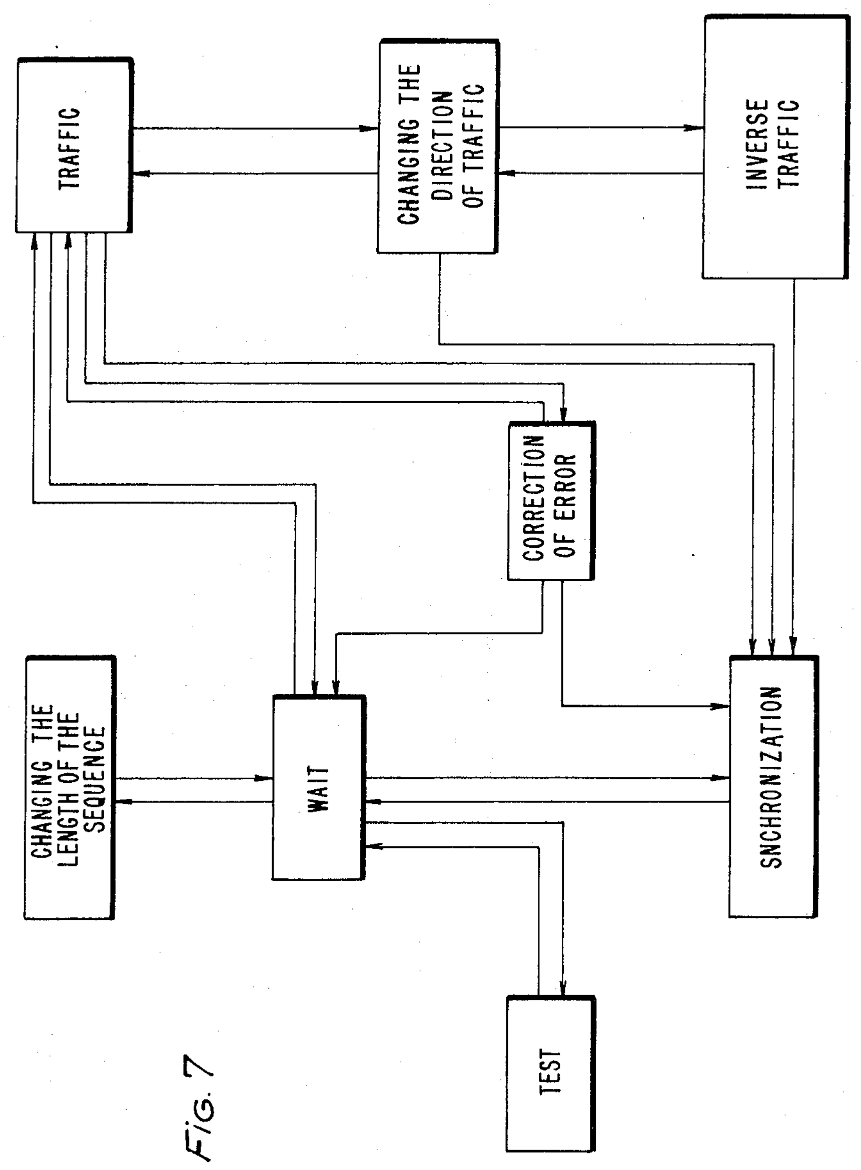
FIG. 7 shows a diagram of the states of transmission in the case of a plurality of "slave" transmitter-receivers controlled from a "master" transmitter-receiver.

FIG. 7 shows the various operating states which the logical element of a transmitter-receiver of this type may assume. It is understood that the changes of state are made on the command of the logical element of the "master" transmitter-receiver, and that by the logical element of a "master" or "slave" transmitter-receiver is understood both the logical coding element of the transmitter and the logical decision element of the receiver connected together to ensure easy operation of the link.

The first stage represented in FIG. 7 is the synchronisation stage, which intervenes first of all from the "master" transmitter to the "slave" receivers and then from the "slave" receivers to the "master" receiver, as already stated.

The second stage is the waiting stage, possibly followed by a test stage, after which it is possible to undertake the traffic stage according to the requirements of utilisation.

In case of error, depending on whether it is marked by a "master" or "slave" receiver and according to the permanence of the error, the controlled operations are returned to the traffic stage, passage to the waiting stage with possibly synchronous change in duration of the sequences or return to the synchronisation stage.

In the case of an alternating link two additional stages are shown:

Change in direction of the traffic, an extremely short situation, and reverse traffic; each of the stages may give rise to a fresh synchronisation.

During the error-correction stage, it is obvious that the operations of synchronisation, changing of the sequence duration, returning to the waiting or traffic stage are carried out automatically at the command of the logical element of the "master" transmitter-receiver, which element is actuated by an operator or controlled by transmitted-information supervising members.

The entire logical means incorporated in a "master" or "slave" transmitter-receiver according to the invention may be divided into a number of functional elements, each having a particular role to play. These maans thus comprise:

The logical coding element of the transmitter selecting the sequence and polarity for modulating the sub-carrier as a function of the information to be transmitted, the logical decoding element of the receiver which element restores, as a function of the transmitted sequence and polarity, the corresponding information according to the state of the threshold devices or decision members, the logical sequence synchronisation element which defines the value of the shift to be applied to the sequence generator of the receiver, and applies this shift as a function of the information supplied by the decoding logical element for ensuring synchronisation of the sequence generators of the local receiver and of the transmitter, with which the latter is in radio link, the logical element of the controller, the latter really effecting the supervision of the transmission system. The states which this controller may assume are those indicated in the diagram of states of FIG. 7.

The inputs of this controller are:

manual controls, such as "master" – "slave" and alternating-duplex switching operations, and changing the length of the sequences, information from external appliances (laboratories, shot-firer for seismic operations), information from the receiver, state of the controller.

The outputs of this controller are:

information going to the transmitter, information going to external appliances, commands going to the transmitter.

The functioning of this controller is such that its outputs depend on its state and its inputs, and that it passes from one state to another when certain conditions are united at its inputs. The choice of these conditions depends on the use which is made of the mode of transmission according to the invention.

According to one embodiment example of the controller, for passing from the synchronisation stage to the waiting stage, the receiver must have received 15 times in succession the waiting sequence without error. It will then pass to the traffic stage if the receiver receives another predetermined sequence, a third predetermined sequence would have caused it to pass to the test stage, but once in the traffic stage, it can no longer pass to the test stage directly. An error indication coming from the decision members and the decoding logical element will cause the system to pass to the "error correction stage" only if it is already in the traffic stage. If the error indication is received 15 times consecutively, the controller will return to the synchronisation stage.

The error correction is considered for the transmission of measurement information, for example. This error correction corresponds to the repetition of words corresponding to a series of sequences stored until the transmission is carried out correctly.

The transmission system according to the invention is advantageously employed with conventional transmission-reception units using frequency or amplitude modulation, pass-band 3 kHz, employed for speech transmission. With such transmitter-receivers and the mode of transmission according to the invention, there has been obtained good quality transmission, whereas by means of identical transmitter-receiver stations, conventional telephony transmissions proved impossible. The results are still greatly superior to those which may be obtained by means of ON-OFF modulation of sub-carriers, such as has been disclosed in the prior art.

Furthermore, the modulation process of the prior art does not permit in a simple manner the conception of forward-and-return link for the accurate transmission of information relative to command instants.

By means of the mode of transmission according to the invention, the transmission of a command instant can be carried out only at the commencement of a generation of pseudo-random sequences and can take effect only at the end of the reception of this generation of sequences. An example will now be described of the carrying out of such an order between a laboratory comprising at least one seismograph connected to an automatic measuring and recording installation, and equipped with a "master" transmitter-receiver station, and the shot firer carrying out the order for the explosion producing the seismic shock and provided with a "slave" transmitter-receiver. These two transmitter-receivers form a transmission unit according to the invention and the use thereof which will be described involves their logical elements adapted to automatic operations which also form part of the mode of transmission according to the invention.

The link according to the invention is assumed to be established and in the waiting stage. The measurement recording unit then transmits a logical signal which initiates the recording process. This logical signal is transmitted to the associated "master" transmitter-receiver and is translated into command or control information at the commencement of a generation of pseudo-random sequences.

At the level of the shot-firer, this information takes effect in the form of a command order at the end of the said generation of pseudo-random sequences. The command order is carried out with a certain delay which is transmitted in numerical form in return to the measurement recording unit. This delay is conventionally called TB (time break) in seismic operations. The measurement recording instruments, to which are transmitted for example the instant corresponding to the end of the control sequence and the said delay in numerical form then possess representative information of the exact instant of the generations of seismic shock, which is fundamental for the use of seismic recording.

Generally also there is transmitted from the shot-firer to the laboratory another measurement result corresponding to the time of ascent of the seismic shock to the surface of the ground, at the level of the shot-firer, called VT or vertical time, by means of a second transmission channel.

There has been constructed for seismic applications a transmitter-receiver permitting transmissions according to the invention. These transmitter-receivers have conventional telephony type high-frequency stages with a 3 kHz pass-band. The sub-carrier used has a frequency of 2,000 Hz, corresponding substantially for the synchronous pseudo-random sequences of this sub-carrier, to be pass-band of 3 kHz of the high-frequency transmission.

The sequences are generated according to three durations: 15, 127 or 1,023, adjustable according to the value of the signal-to-noise ratio of the transmission.

The smallest sequence duration permits the use of 15 sequences, that is to say 30 different signals, since there are two polarities for each signal. Eight sequences only are used for seismic applications, corresponding therefore to 16 utilisable signals, and to eight coherent demodulation units, each associated with a matched filter for reception.

These sequences are coded for this embodiment according to the preferred coding already mentioned. These sixteen signals arranged in a binary order supply all the binary numbers between 0000 and 1111. This corresponds to four independent binary channels.

Of these 16 possible signals, eight are intended for the transmission of commands or numerical information, which corresponds therefore to 3 independent binary channels, the fourth being at a given state, 0 for example. The other 8 signals are intended for the transmission of control information of the link corresponding to exchanges between the logical elements of the various transmitters-receivers. This again corresponds to 3 independent binary channels, the fourth then being in the state 1. It may therefore be said that the fourth channel serves to route the transmitted information either to the user or to the transmission equipment itself. The waiting sequence, for example, forms part of the group of 8 signals controlling or supervising the link, the fourth channel being in the state 1.

According to a modification of the mode of transmission according to the invention, of particular interest for the seismic applications just described, the transmission of spoken information is carried out by superposition with the phase-modulated sub-carrier.

Figure 8A:
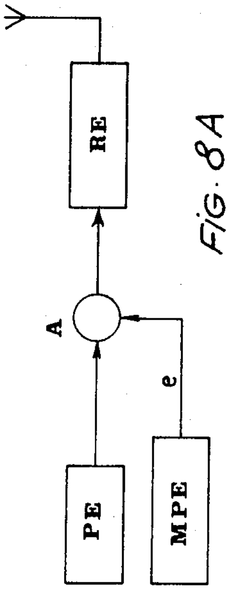
FIGS. 8A and 8B shows a modification permitting the transmission of speech respectively at a transmitter and at a receiver.

For this purpose, the transmission high-frequency carrier wave is modulated partly by the phase-modulated sub-carrier and partly by speech signals, as in a conventional telephony link. This corresponds to the diagram of FIG. 8A in which the signals from the phase-modulator MPE of FIG. 2 and the speech signals from amplifier stages PE are mixed in an adder A before being applied to the high-frequency transmission stages RE.

Figure 8B:
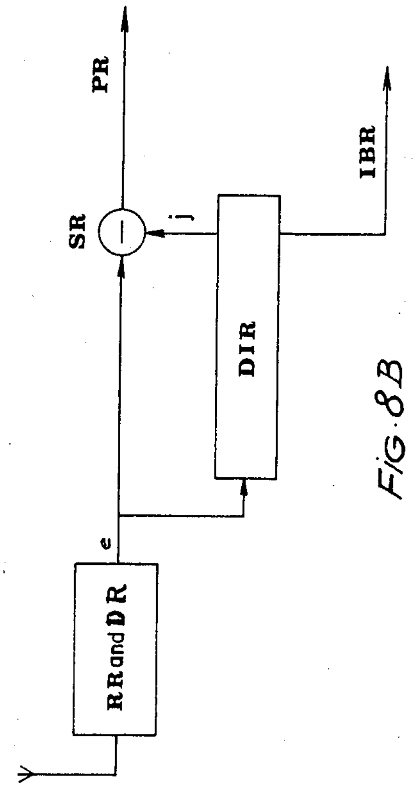

On reception, the speech signal does not substantially affect the reception of the pseudo-random signals, since the mean value of the speech signals is substantially zero. The transmitted pseudo-random sequence is therefore decoded in the manner described in the foregoing. It is then removed from the low-frequency signal received after modulation, thus supplying the signal corresponding to the speech, possibly increased in noise. This varient corresponds to the modifications of the basic circuit diagram of the receiver shown in FIG. 8B. In this figure and at the output of the high-frequency reception and demodulation stages RR and DR appears the composite signal formed of speech and the phase-modulated sub-carrier. This signal then forms the subject of the reception process according to the invention terminating in an identification and decoding of the transmitted pseudo-random sequence. This process is carried out in the stage DIR which is an overall representation of all the low-frequency reception stages, shown in FIG. 5. At the output of this stage DIR there are available, on the one hand, the binary information transmitted on the line IBR, and on the other hand a reconstitution without speech of the sub-carrier phase-modulated by this sequence, which is easy to carry out for the skilled person. This latter signal is deprived in a subtractor SR of the signal supplied at the output of stages RR and DR, that is to say of the aforesaid low-frequency signal;

there is then available on a line PR the low-frequency signal corresponding to speech, which may be amplified in conventional manner.

According to this modification, the power assigned to the transmission of the pseudo-random sequences is not the total available power. For this reason, the transmission of speech is preferably carried out in controlled manner only in the case of a good-quality link and during the transmission of the waiting sequences between the various transmitter-receivers.

The mode of transmission according to the invention is readily adaptable to transmissions using amplitude modulation using a carrier wave whose pass-band is 3 kHz. It is easily extended to transmissions using amplitude modulation with suppression of the carrier wave by providing synchronous demodulation of the mean frequency of the receivers. These processes are well known to the skilled person, and after this demodulation permit the production of the phase-modulated sub-carrier of the invention practically without frequency or phase slip.

In the case of single-side band transmission, there is practically no reference at reception for the high-frequency carrier wave, and it becomes impossible to effect demodulation of the high-frequency carrier waves permitting restoration of a phase-modulated sub-carrier without frequency of phase slip.

Figure 9:
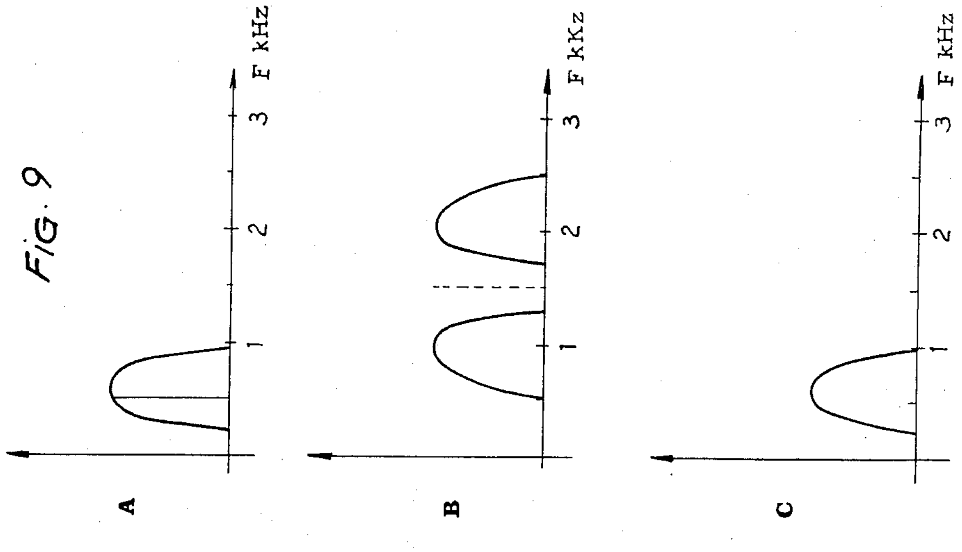
FIGS. 9A, 9B and 9C show an embodiment example of the mode of transmission according to the invention by means of a single-sideband link with a 3 kHz low-frequency pass-band.

According to the invention, two sub-carriers are then used, permitting the mode of transmission according to the invention by means of single-sideband links having a 3 kHz band-pass. A first 500 Hz sub-carrier is phase modulated according to the invention by a pseudo-random sequence. This signal could be included in the 250 to 1,000 Hz frequency band (FIG. 9A). This signal modulates an auxiliary sub-carrier at 1,500 Hz with suppression of the carrier, which brings the signal into the band included between 500 and 2,500 c/s (FIG. 9B). This signal then modulates a high-frequency carrier wave in single-sideband.

On reception, the signal is demodulated in the conventional manner in a single-sideband receiver, which restores the signal, the band-pass of which is shown in FIG. 9B. This signal is then subjected to synchronous modulation around its 1,500 Hz sub-carrier. After this operation, the 500 Hz sub-carrier phase-modulated by a pseudo-random sequence is again obtained (FIG. 9C) the use of the auxiliary sub-carrier thus makes it easily possible to get rid of the frequency and phase slips inherent in single-sideband transmissions. It is only necessary to employ phase control of the auxiliary sub-carrier local oscillators used for synchronous demodulation. This synchronous demodulation is carried out by means of Costas loops described in "Communication Systems and Techniques," Misha Schwartz, William R. Bennett, Seymour Stein, McGraw Hill, New York, 1966.

The use of a single-sideband link for the mode of transmission according to the invention is advantageous because of the better signal-to-noise ratio which this type of link provides.

The present invention is by no means limited to the embodiments described, particularly with regard to the transmitter-receivers and their incorporated logical elements. It covers any modification permitting the transmission of information in the form of a sub-carrier phase-modulated by pseudo-random sequences, irrespective of the coding system permitting the passage of information to the said sequences. Nor is it limited to the uses described either with regard to the various operational stages: synchronisation, waiting, test, traffic, etc. or for the preferred operation in the seismic domain which forms the principal preoccupation.

I claim:

1. The method of synchronising transmission of information through a transmission channel between a transmitting station and a receiving station, comprising the steps of a. generating a low frequency sinusoidal sub-carrier of known period at said transmitting station, b. generating a consecutive repetition of a known pseudo-random sequence of selected duration having a particular time-succession of two different states, the time-period at each state in the succession being equal to or a multiple of said known period, c. phase-reversal modulating the sinusoidal sub-carrier depending upon the successive states in said consecutive repetition, d. generating at said receiving station a local low frequency sub-carrier having said known period and being synchronous with the sub-carrier received from the transmitting station, e. generating a shiftable local consecutive repetition of said known pseudo-random sequence of selected duration, the duration of each state in the succession being equal to or a multiple of the known period, f. phase reversal modulating the local sub-carrier depending upon the successive states in said consecutive repetition, g. comparing the phase reversal modulated sub-carrier received from the transmission with the phase reversal modulated local sub-carrier, and shifting said local consecutive repetition of the known pseudo-random sequence until the comparison indicates that it is synchronous with the consecutive repetition received from transmission.

2. The method of claim 1, wherein the step of generating a local low frequency sub-carrier at said receiving device comprises generating a local low frequency sub-carrier having a period adjustable about said known period, and adjusting the period of the local sub-carrier until it is synchronous with the sub-carrier received from the transmission.

3. The method of claim 1 wherein the step of comparing the received phase-reversal modulated sub-carrier with the local phase reversal modulated sub-carrier comprises the steps of coherently demodulating the received phase reversal modulated sub-carrier with the local phase reversal modulated sub-carrier, with the signal from the demodulation being an instantaneous representation of the correspondence between the transmitted pseudo-random sequence and the local pseudo-random sequence, integrating the signal from the demodulation for the duration of the local pseudo-random sequence, and comparing the integrated signal to a reference value, with the synchronism being admitted when the integrated signal exceeds the reference value.

4. A method of synchronous transmission of information using a transmission channel between a transmitting station and receiving station, comprising the steps of a. generating at said transmitting station a low frequency sinusoidal sub-carrier of known period, b. generating a consecutive repetition of each of a predetermined number of known pseudo-random sequences of selected duration, each having a particular time succession of two different states, the time period at each state in the succession being equal to or a multiple of said known period, at least certain of said sequences being representative each of a respective datum of information to be transmitted, c. phase-reversal modulating the sinusoidal sub-carrier depending upon the successive states of successively selected ones of the pseudo-random sequences, thereby permitting the transmission of data of information, the transmission instants of each datum coinciding with the commencement of the generation of the corresponding pseudo-random sequences, d. generating at said receiving station a local low frequency sub-carrier having said known period and being synchronous with the sub-carrier received from the transmitting station, e. generating a local consecutive repetition of each of said predetermined number of known pseudo-random sequences of selected duration, the duration of each state in the succession being equal to or a multiple of the known period, f. separately phase-reversal modulating the local sub-carrier according to each repetition of a known pseudo-random sequence, depending upon the successive states therein, g. separately correlating the phase-reversal modulated sub-carrier received from the transmission station with each of the phase-reversal modulated local sub-carriers, and h. continuously comparing the locally phase-reversal modulated sub-carrier with the phase-reversal modulated sub-carrier received from the transmission station and accepting the correlation thereof as a datum of information, whereby there is no delay in the transmission but said known duration.

5. Apparatus for the synchronous transmission of information comprising a. a transmitter for generating a high-frequency carrier wave, said transmitter including means for generating a sinusoidal sub-carrier, having a known low frequency, b. shift register means for continuously generating a pseudo-random sequence of selected duration having a particular time succession of two different states and synchronous with said sub-carrier, and c. means for effecting phase-reversal modulation of the sinusoidal sub-carrier depending upon the successive states in the pseudo-random sequence, the sub-carrier thus phase-modulated modulating in turn the high-frequency carrier wave, thereby effecting the transmission over the transmission link of the pseudo-random sequence.

6. The apparatus of claim 5, further including a receiver for receiving the high-frequency carrier wave originating from the transmitter and restoring the phase reversal modulated low-frequency sub-carrier of the transmitter with increased noise, said receiver comprising a. means for generating a low-frequency local signal, having substantially said known low-frequency,
b. means for phase-locking said low-frequency local signal relative to the said restored sub-carrier,
c. shift register means for continuously generating the same pseudo-random sequence of selected duration as at said transmitter, synchronous with said phase-locked low-frequency local signal.
d. means for phase-reversal modulating the low-frequency local signal with the pseudo-random sequence,
e. correlating means for correlating said restored phase reversal modulated low-frequency sub-carrier with the local phase-reversal modulated low-frequency signal, and
f. means for altering the shifting of said shift-register means until the received phase-reversal modulated sub-carrier correlates with the phase-reversal modulated local signal.

7. Apparatus for the synchronous transmission of information comprising a. a transmitter for generating a high-frequency carrier wave and a sinusoidal low-frequency sub-carrier thereof,
b. shift register means for continuously generating a predetermined number of pseudo-random sequences of selected duration, each having a particular time succession of two different states, and synchronous with said sub-carrier,
c. selecting means responsive to a series of datum transmission orders for serially selecting corresponding ones of the pseudo-random sequences, with a waiting sequence being selected in the lack of such order, and
d. means for effecting phase-reversal modulation of the sinusoidal sub-carrier depending upon the successive states in each pseudo-random sequence of the series, the sub-carrier thus phase-modulated modulating in turn the high-frequency carrier wave, thereby effecting the transmission over the transmission link of a series of pseudo-random sequences each representative of a respective datum of information.

8. The apparatus of claim 7, further including a receiver for receiving the high-frequency carrier wave originating from the transmitter and restoring the phase-reversal modulated low-frequency sub-carrier of the transmitter with increased noise, said receiver comprising a. means for generating a low-frequency local signal having substantially said known low-frequency,
b. means for restoring an unmodulated sub-carrier from the received phase-reversal modulated one,
c. means for phase-locking said low-frequency local signal relative to the said restored sub-carrier,
d. shift register means for continuously generating local pseudo-random sequences of selected duration, synchronous with said phase-locked low-frequency local signal, said local pseudo-random sequences being identical to corresponding pseudo-random sequences at said transmitter,
e. means for altering the shifting of said shift register means until at least one local pseudo-random sequence substantially coincides in time with the same pseudo-random sequence from said transmitting station,
f. means for separately phase-reversal modulating the low-frequency local signal with each of the local pseudo-random sequences,
g. correlating means for separately correlating the said restored phase reversal modulated low-frequency sub-carrier with each local low-frequency signal, each of said signals being phase-reversal modulated with its own pseudo-random sequence, and
h. decision means responsive to said correlating means for accepting at the end of said pseudo-random sequence from said transmitting station the datum of information corresponding to said pseudo-random sequence and for accepting no information in the presence of a waiting sequence, whereby there is no delay except for said unknown duration in the transmission of information.

9. The apparatus of claim 8, wherein said correlating means includes a. a plurality of coherent demodulators equal in number to that of the locally generated pseudo-random sequences, each for phase-reversal modulating the local low-frequency sub-carrier by one of said sequences and continuously and synchronously comparing it with said restored phase-reversal modulated low-frequency sub-carrier, each of said demodulators supplying at its output an electrical signal representing at the end of each pseudo-random sequence the identity of each of said pseudo-random sequences from said transmitting station.
b. a plurality of integrators equal in number to that of the coherent demodulators, each integrator integrating the output signal from a respective coherent demodulator for and synchronous with said selected duration of the pseudo-random sequences, and
c. a plurality of threshold devices each coupled to a respective integrator for indicating a corresponding correlation when the amplitude of the integrated signal exceeds a reference value.

10. The apparatus of claim 9, wherein at said transmitter at least certain pseudo-random sequences have respective corresponding sequences in the predetermined number which are the exact logical inverse thereof, and at least certain corresponding ones of said threshold devices at said receiver selectively respond to the polarity of its input integration signal by indicating one or another correlation when the amplitude thereof exceeds the threshold in absolute value.

* * * * *